(12) United States Patent
Dhoolia et al.

(10) Patent No.: US 9,799,326 B2
(45) Date of Patent: Oct. 24, 2017

(54) TRAINING A COGNITIVE AGENT USING DOCUMENT OUTPUT GENERATED FROM A RECORDED PROCESS

(71) Applicant: International Business Machines Corporation, Armonk, NY (US)

(72) Inventors: Pankaj Dhoolia, Ghaziabad (IN); Neelamadhav Gantayat, New Delhi (IN); Monika Gupta, New Delhi (IN); Senthil Kumar Kumarasamy Mani, Bangalore (IN); Vibha Singhal Sinha, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/006,771

(22) Filed: Jan. 26, 2016

(65) Prior Publication Data

US 2017/0213544 A1    Jul. 27, 2017

(51) Int. Cl.
*G10L 21/00* (2013.01)
*G10L 15/06* (2013.01)
*G10L 15/22* (2006.01)
*G06F 17/27* (2006.01)
*G06F 17/24* (2006.01)

(52) U.S. Cl.
CPC .......... *G10L 15/063* (2013.01); *G06F 17/241* (2013.01); *G06F 17/2745* (2013.01); *G10L 15/22* (2013.01); *G10L 2015/0631* (2013.01); *G10L 2015/0638* (2013.01)

(58) Field of Classification Search
CPC .............. G06F 15/18; G06F 17/30029; G06F 19/3406; G06F 1/1626; G06F 2203/0381; G06F 3/013; G06F 3/015; G06F 3/038; G06F 17/2881; G09B 7/00; G09B 5/06; G09B 19/00; G06T 7/215; G10L 13/033; G10L 15/18; G10L 15/1815; G10L 15/1822; G10L 15/22
USPC ................ 715/716, 273; 434/365, 350, 262; 704/251, 270, 275, 270.1, 231
See application file for complete search history.

(56) References Cited

U.S. PATENT DOCUMENTS

| | | | |
|---|---|---|---|
| 6,311,159 B1 * | 10/2001 | Van Tichelen | .......... G10L 15/18 704/251 |
| 7,296,007 B1 | 11/2007 | Funge et al. | |
| 7,505,817 B2 | 3/2009 | McDaniel et al. | |
| 7,983,997 B2 | 7/2011 | Allen et al. | |
| 7,984,007 B2 | 7/2011 | Reumann et al. | |

(Continued)

*Primary Examiner* — Vijay B Chawan
(74) *Attorney, Agent, or Firm* — Ference & Associates LLC

(57) ABSTRACT

One embodiment provides a method for generating a process learning graph and a document output from a recorded process for training a cognitive agent, the method comprising: utilizing at least one processor to execute computer code that performs the steps of: obtaining a recording of a process, wherein the recording comprises a demonstration of executing the process; generating, using the recording, the process learning graph, wherein the process learning graph identifies a process flow; generating, using the recording, the document output, wherein the document output comprises process screen transitions and process steps; and providing the process learning graph and the document output to the cognitive agent. Other aspects are described and claimed.

20 Claims, 4 Drawing Sheets

(56) References Cited

U.S. PATENT DOCUMENTS

| | | | |
|---|---|---|---|
| 8,332,765 B2 | 12/2012 | Ergan et al. | |
| 2002/0168621 A1* | 11/2002 | Cook | G09B 7/00 434/350 |
| 2004/0095374 A1* | 5/2004 | Jojic | G06T 7/215 715/716 |
| 2005/0123894 A1* | 6/2005 | Hamilton | G09B 7/00 434/365 |
| 2006/0166174 A1* | 7/2006 | Rowe | G09B 5/06 434/236 |
| 2006/0256953 A1* | 11/2006 | Pulaski | H04M 3/5175 379/265.06 |
| 2008/0022200 A1* | 1/2008 | Hamilton | G09B 7/00 715/273 |
| 2009/0228483 A1* | 9/2009 | Debeus | G06F 17/2881 |
| 2011/0283190 A1* | 11/2011 | Poltorak | G10L 13/033 715/716 |
| 2014/0113263 A1* | 4/2014 | Jarrell | G09B 19/00 434/262 |
| 2015/0324692 A1* | 11/2015 | Ritchey | G03B 37/00 348/14.08 |

\* cited by examiner

TRAINING A COGNITIVE AGENT USING DOCUMENT OUTPUT GENERATED FROM A RECORDED PROCESS

BACKGROUND

A cognitive agent is a system which may understand natural language text or speech. The cognitive agent can interpret the natural language text or speech and respond to the incoming natural language text or speech. To respond, the cognitive agent accesses a knowledge base to find suitable responses. Companies may use such cognitive agents to provide support (e.g., information technology support, etc.) for employees of the company.

When a cognitive agent responds to a user, for example, when a user asks a question or requests support, the cognitive agent must have an understanding of the topic related to the question or support. For example, if a user requests support related to performing a process, the cognitive agent must have an understanding of the steps associated with the process. If the cognitive agent has such an understanding, then the cognitive agent can hold a conversation with the user.

BRIEF SUMMARY

In summary, one aspect of the invention provides a method for generating a process learning graph and a document output from a recorded process for training a cognitive agent, the method comprising: utilizing at least one processor to execute computer code that performs the steps of: obtaining a recording of a process, wherein the recording comprises a demonstration of executing the process; generating, using the recording, the process learning graph, wherein the process learning graph identifies a process flow; generating, using the recording, the document output, wherein the document output comprises process screen transitions and process steps; and providing the process learning graph and the document output to the cognitive agent.

Another aspect of the invention provides an apparatus for generating a process learning graph and a document output from a recorded process for training a cognitive agent, the apparatus comprising: at least one processor; and a computer readable storage medium having computer readable program code embodied therewith and executable by the at least one processor, the computer readable program code comprising: computer readable program code that obtains a recording of a process, wherein the recording comprises a demonstration of executing the process; computer readable program code that generates, using the recording, the process learning graph, wherein the process learning graph identifies a process flow; computer readable program code that generates, using the recording, the document output, wherein the document output comprises process screen transitions and process steps; and computer readable program code that provides the process learning graph and the document output to a cognitive agent.

An additional aspect of the invention provides a computer program product for generating a process learning graph and a document output from a recorded process for training a cognitive agent, the computer program product comprising: a computer readable storage medium having computer readable program code embodied therewith, the computer readable program code comprising: computer readable program code that obtains a recording of a process, wherein the recording comprises a demonstration of executing the process; computer readable program code that generates, using the recording, the process learning graph, wherein the process learning graph identifies a process flow; computer readable program code that generates, using the recording, the document output, wherein the document output comprises process screen transitions and process steps; and computer readable program code that provides the process learning graph and the document output to a cognitive agent.

A further aspect of the invention provides a method for generating a process learning graph and a document output from a recorded process for training a cognitive agent, the method comprising: utilizing at least one processor to execute computer code that performs the steps of: obtaining a recording of a process, wherein the recording comprises a demonstration of executing the process; identifying at least one system response, occurring during execution of the process, based upon at least one user input; producing, from the recording, at least one screen capture of a process screen transition; identifying, from the recording, process screen headings; defining, from the recording, user input requirements during execution of the process; generating the process learning graph, wherein the process learning graph identifies a process flow comprising a plurality of process flow steps; the plurality of process flow steps comprising the process screen headings and user input requirements; generating the document output, wherein the document output comprises the at least one screen capture, at least one system response, and at least one process step; providing the process learning graph and the document output to the cognitive agent; receiving, at the cognitive agent, a message from a user, wherein the user is executing the process; mapping the message to at least one process flow step in the process learning graph; confirming, with the user, the mapped at least one process flow step; and verifying, with the user, that the user performed process flow steps, contained within the process learning graph, preceding the at least one process flow step.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
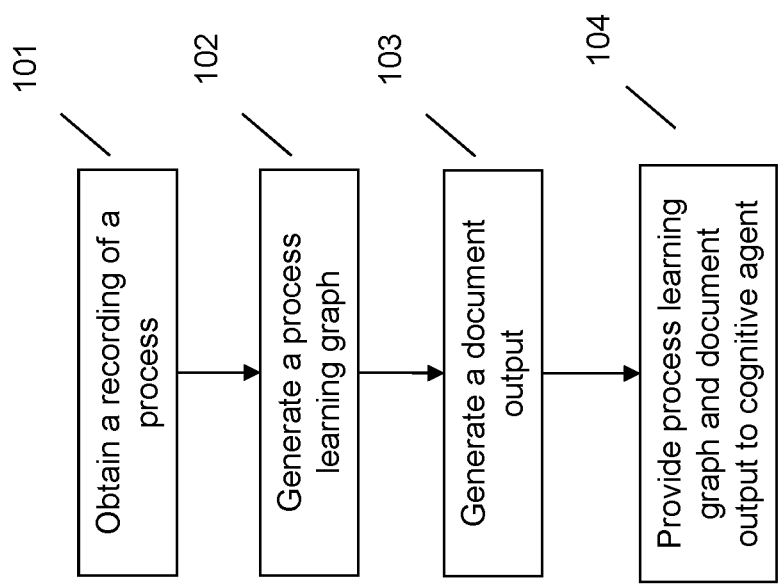
FIG. 1 illustrates a method of training a cognitive agent using document output generated from a recorded process.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
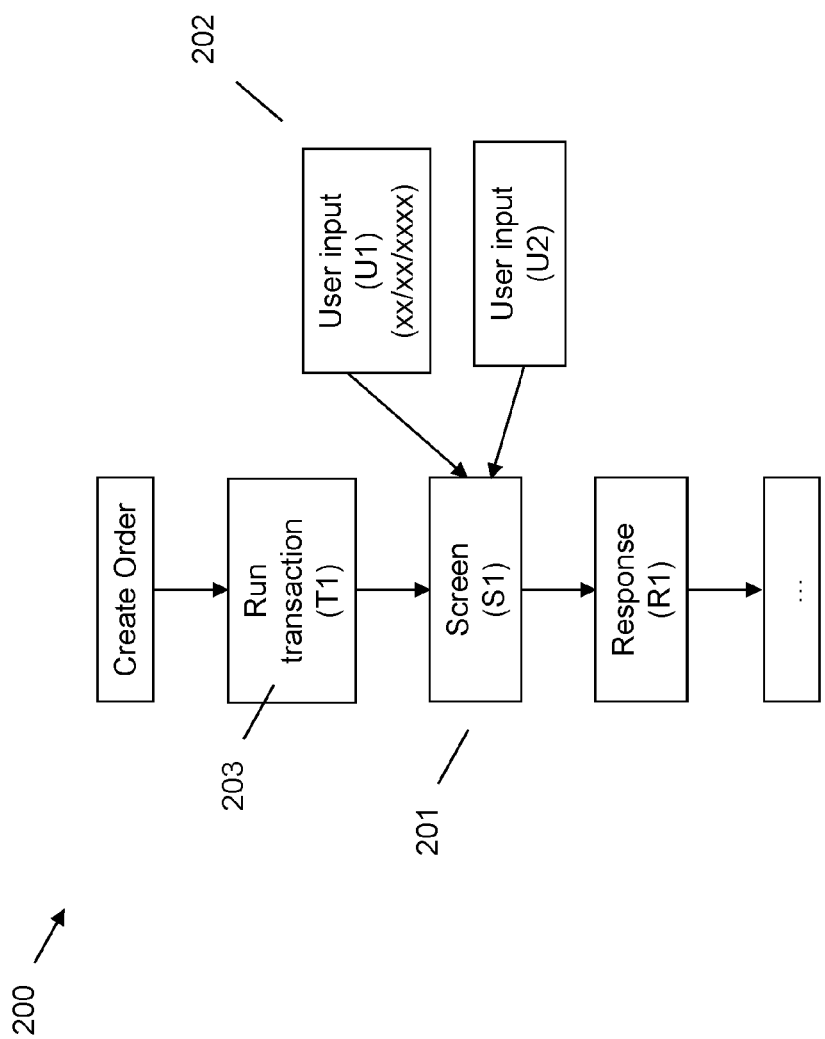
FIG. 2 illustrates an example process learning graph.
Figure 3:
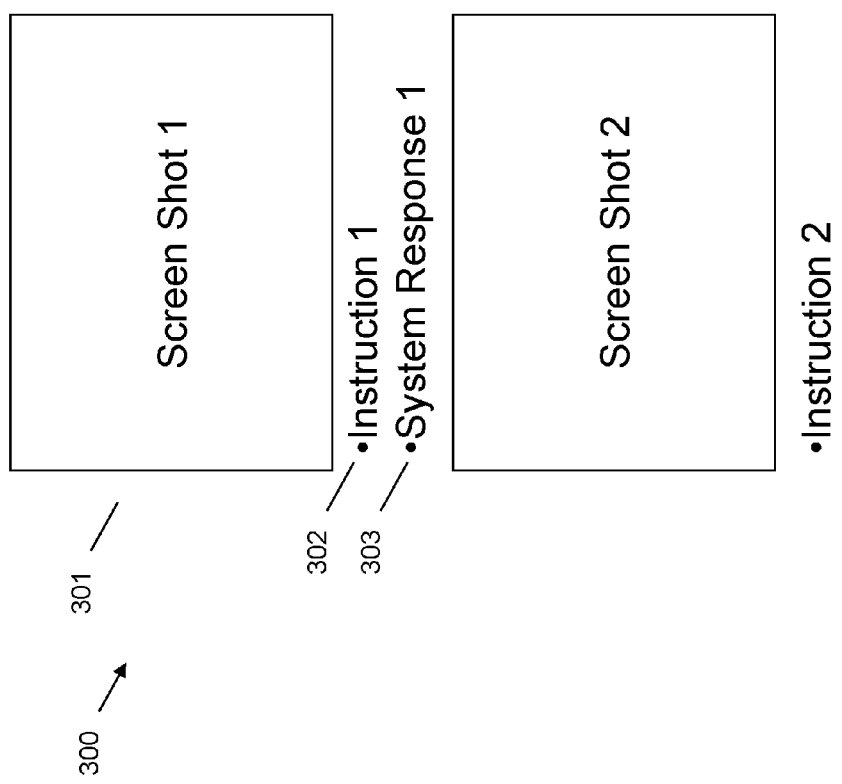
FIG. 3 illustrates an example document output.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

For a cognitive agent to be able to provide support, the cognitive agent must have a knowledge base relating to the request for support. Generally, cognitive agents are used to answer questions and are thereby able to access the knowledge base to find a suitable answer to the question. It would be helpful to also be able to use cognitive agents to provide support for processes. However, the issue with using cognitive agents for supporting processes is that the cognitive agent does not usually have knowledge of the process steps. Usually a subject matter expert has knowledge of the process steps, but there is no easy way for the subject matter expert to convey this information into a knowledge base that a cognitive agent can access for supporting the process.

Accordingly, an embodiment provides a method of generating a process learning graph and a document output from a recorded process to be used in training a cognitive agent. In one embodiment, a subject matter expert may execute the process and while doing so, the process may be recorded (e.g., as a script, using a video recorder, etc.). An embodiment may then augment the recording. For example, one embodiment may take screen shots of process screen transitions, identify process screen headings, define user input requirements needed during the execution of the process, and the like. Using the augmented recording, an embodiment may generate a process learning graph which describes the process flow. Additionally, an embodiment may generate a document output which may identify the screen captures, system responses, process steps, and the like.

The process learning graph and the document output may then be provided to the cognitive agent for use in training the cognitive agent. In other words, the process learning graph and the document output may be used to create the knowledge base accessible by the cognitive agent. The cognitive agent may, upon receiving a message from a user, match the message to a location within the document output. The cognitive agent may then verify that the user has completed the process steps as necessary. For example, in one embodiment a user may provide a request for support regarding a process the user is currently executing. Using the generated document output, the cognitive agent can map the current step of the user to a step included in the process learning graph or document output. Upon identifying the step within the document output, the cognitive agent can verify the prior steps that the user should have taken and user input that the user should have provided. Thus, the cognitive agent can provide support for the process using the provided document output.

As an example, a subject matter or process expert may perform the steps of completing a process within a system. As the process expert is performing the steps, an embodiment may record the steps associated with correctly performing the process. The recording may be a script recording, a trace recording, a video recording, or other recording. Once the recording is made and obtained by the system, an embodiment may generate a process learning graph. This learning graph may be in the form of a flow chart that comprises blocks that may represent different screens encountered during the execution of the process. For example, the first block may represent the first screen that a user is presented with. The next block may include a step that the user has to perform, for example, executing the step in the process. The learning graph may also comprise blocks which indicate required user input and possibly the format of the user input. In other words, the process learning graph may include a flow chart having blocks which represent screens, system responses, user input, and the like.

An embodiment may additionally generate a document output. The document output may include screen shots of different screens that a user may be presented with. The document output may also include instructions that a user has to perform. For example, the instructions may include "click on button with Label: Transaction." The document output may also include text including system responses that would be provided if the steps are completed correctly. For example, a system response text may include "You'll see a screen with Title: Code". The process learning graph and the document output may then placed in a location accessible to the cognitive agent.

When a user is performing the process and is having difficulties, the cognitive agent can access the learning graph and the document output to assist the user. The cognitive agent can access the documents and match the screen and actions by the user to walk the user through the process. As an example, if the user is at screen three of the process, the cognitive agent can match screen three to the learning graph and document output of the completed process. From there the cognitive agent can identify what actions the user should have taken, the expected system response based upon those actions, the actions the user needs to take, and the like. The cognitive agent can then ask the user questions to assist the user in overcoming the difficulties that the user is experiencing and walk the user through the steps of executing the process.

Such a system provides a technical improvement over current systems for providing a knowledge base to a cognitive agent. Current systems do not allow a method or system for providing a knowledge base relating to execution of a process to a cognitive agent. The systems and methods as described herein provide a method and system for allowing a subject matter expert to execute a process. During execution, the process is recorded. The system as described herein is then able to augment the recorded process and generate documents which can be used as a knowledge base by a cognitive agent to provide support for a user executing the process. Thus, the cognitive agent can then be used to provide support for not only questions, but also for requests for supporting processes.

Referring now to FIG. 1, at 101, an embodiment may obtain a recording of a process. The recording may be a demonstration of executing the process. For example, a subject matter expert or user may demonstrate the steps associated with the desired process. In other words, the user may execute a process in the sequence of steps that are supposed to be completed for accurate execution of the process. In one embodiment the recording may comprise a script recording of the steps followed while executing the process. For example, as a user clicks through an application or process, the entire click-through will be recorded as a script. In one embodiment the recording may include a video recording of the execution of the process. As an example, while the user performs the steps for execution of the process a video recording may be taken.

Obtaining the recording may include the system receiving the recording from a source, for example, a user manually uploading the recording to the system. Alternatively, the system may access a location and obtain the recording. For example, the system may access a remote storage location and retrieve the recording. In other words, obtaining the recording may be an active or passive action by the system. The system may also obtain the recording by recording the process while the user is performing the steps associated with the process. In other words, the system may be used to create the recording. The recording may then be stored by the system for later access.

Once the process is recorded, an embodiment may augment the recording. In one embodiment, this augmenting may be considered instrumenting the recording. This augmenting may define how a user interacted with the process while the process was recorded. User interactions may include: what buttons the user selected to move from one screen to another, what inputs were necessary by the user, what was the formatting of the inputs provided by the user, what fields were selected by the user, and the like. The augmenting may also identify the responses of the system as the user interacts with the process. Responses of the system may include: what screens were provided to the user, what screens were provided when a particular input was received, pop-up menus that were provided, and the like. In augmenting the recording, an instrumented script may be created which may include the originally recorded script having statements inserted which define the user interactions and system responses.

An example of augmenting the recording includes taking screen captures ("screenshots") of the process screen transitions. For example, as the process steps cause new screens to be presented to the user, an embodiment may take screen captures of these new screens. Augmenting may also include identifying process screen headings. For example, if a screen has a name or heading, these screen headings may be identified. Another type of augmentation may include defining user input requirements. For example, if, during the execution of the process, the user is required to provide inputs, the system may identify where these user inputs are needed. Additionally, in the case of user inputs, an embodiment may identify a format or condition of the user inputs. As an example, if one of the required user inputs is a date, an embodiment may identify that the user input should be numbers and may additionally identify the format of the date. As another example, if the user must provide an input of eight characters, an embodiment may identify that the user input should be eight characters long.

In the case of a video recording, annotations may be provided within the video which may identify user inputs, screen headings, actions, and the like. These annotations may then be deciphered by the system to create the augmented recording. Alternatively, the annotated video recording may be used by the system as the augmented recording. In the case of a video recording, the process flow, process screen transitions, process steps, and the like, may be extracted from the video recording. One embodiment may use the annotations included in the video to make these extractions.

At 102 an embodiment may generate a process learning graph. An example process learning graph 200 is shown in FIG. 2. The graph depicts the process flow which may indicate the steps associated with the process. The graph may comprise the process screen headings and user input requirements. For example, as shown in FIG. 2, the process flow may describe what actions results in a transition to other actions, what screens require user input 201, the format of the user input 202, and the like. Each of the blocks in the process learning graph may be identified by the screen heading 203.

At 103 an embodiment may generate a document output. An example document output 300 is shown in FIG. 3. The document output may contain the screen captures 301, the system responses 303, and the process steps. The process steps may be described as instructions 302 within the document output. As an example, assume that a user has opened an application having a starting screen. On this screen a user has to provide a part number in the format of two characters following by six numbers. Upon providing the correct input, the process progresses to a screen displaying information relating to the part number. The document output may have a screen shot of the first screen requiring the user input. The instruction may include: "Provide part number in the format XX###### at the location with Label: Part Number". The system response may include: "You'll see a screen with title: Part Description". The next screen shot may then be a screen shot of the resulting screen. As a comparison, the document output may resemble an instruction manual of sorts.

At 104 an embodiment may provide the process learning graph and the document output to the cognitive agent. In providing these documents to the agent, the documents may be fed directly to the agent. Alternatively, the documents may be placed in a storage location that is accessible by the agent. When the agent then needs the documents, the agent may access the storage location to retrieve or access the documents. These documents can then be used by the cognitive agent as the knowledge base for the cognitive agent.

For example, assume that a user is performing the process and is having difficulty. The user may access the cognitive agent and provide a message to the cognitive agent indicating the user is having difficulty. In one embodiment, the message may include an identification of which process the user is trying to execute. The message may also include an indication of the step with the process associated with the difficulty the user is having. Alternatively, the message may not include any identification information and the cognitive agent may identify the process and process step. For example, the cognitive agent may be provided with a screen shot of the process step where the user currently is. Using this screen shot the cognitive agent can then compare and match the screen shot to a process and process step. As another example, the user may provide a screen heading that can be mapped to a process or process step.

Once the cognitive agent has identified the process, the cognitive agent may map the process step that the user is currently on to a process step within the document output and process learning graph. As an example, the cognitive agent may identify wherein the process learning graph the user's step is and what steps precede the user's current step. The cognitive agent may also identify if any user inputs were required and the format, if any, of the required user inputs. Upon identifying the step that the user is currently on, the cognitive agent may verify this with the user. For example, the cognitive agent may request that the user verify that they are at "Screen 1" of "Process A". Upon receiving this verification the cognitive agent may then verify whether the user provided the correct user inputs and performed the correct user actions for the preceding steps. For example, the cognitive agent may identify the preceding steps, user inputs, and expected system response, using the process learning graph and document output. The cognitive agent may also verify with the user whether system responses that were expected per the process learning graph and document output actually occurred.

As a working example, the user may indicate "I have a problem running transaction T1, while on screen S1." The cognitive agent may then find "Screen S1" in the document output. The agent may then ask the user, "Have you provided User Input U1 in format XX/XX/XXXX and User Input U2?" based upon the process learning graph and the document output. The agent may also offer to walk through the steps for performing Transaction T1 with the user. In walking through the process the agent may use the process learning graph and the document output to identify the steps that the user should perform during execution of the process.

Figure 4:
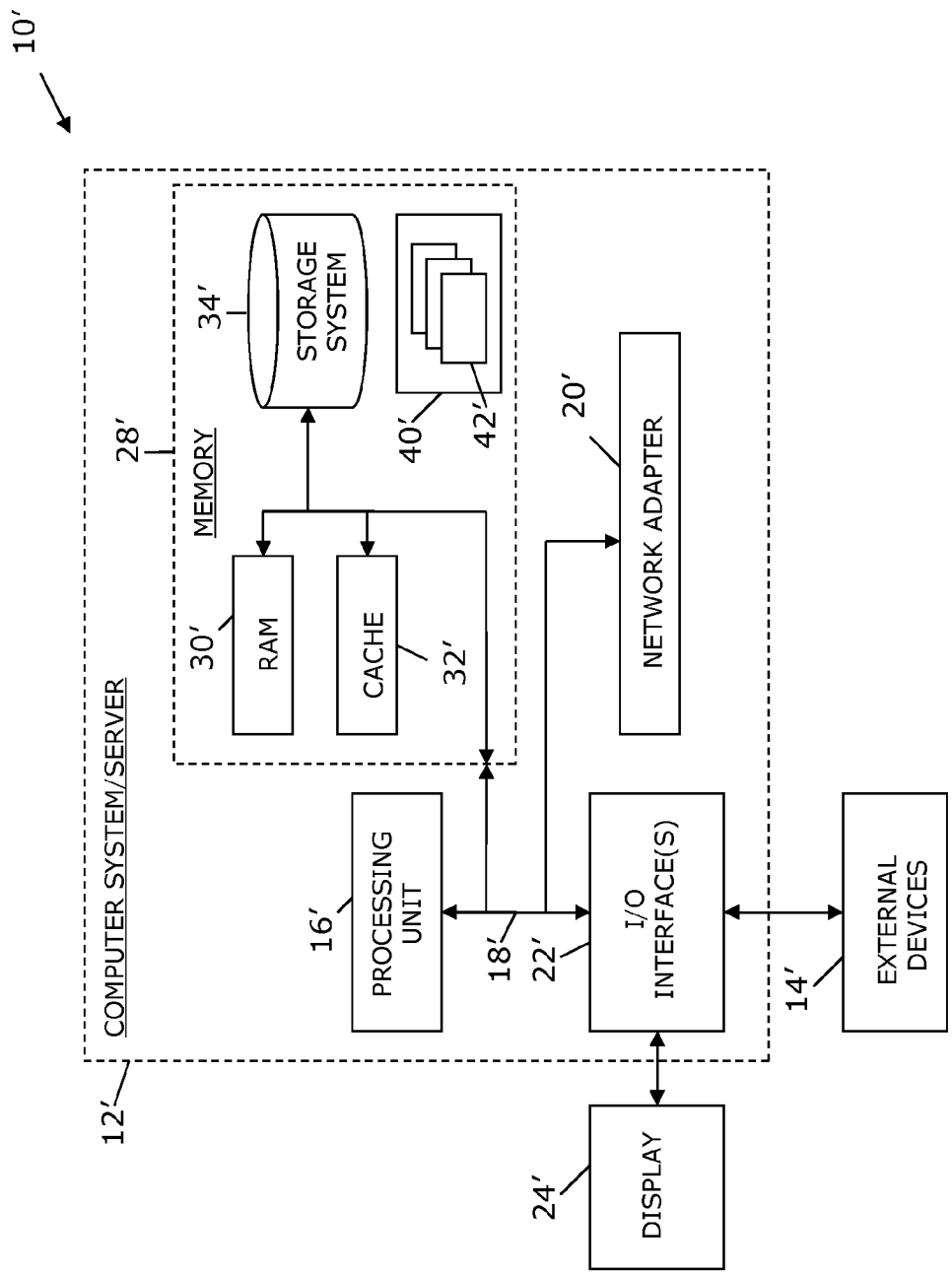
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a process learning graph and a document output from a recorded process for training a cognitive agent, the method comprising:
utilizing at least one processor to execute computer code that performs the steps of:
obtaining a recording of a process, wherein the recording comprises a demonstration of executing the process;
generating, using the recording, the process learning graph, wherein the process learning graph identifies a process flow;
generating, using the recording, the document output, wherein the document output comprises process screen transitions and process steps;
expanding a knowledge base of the cognitive agent by providing the process learning graph and the document output to the cognitive agent;
accessing, by the cognitive agent and responsive to receiving a request by a user corresponding to the process, the knowledge base for the process learning graph and the document output; and
assisting, using the cognitive agent, the user with at least one step of the process by traversing the process learning graph and confirming process flow steps.

2. The method of claim 1, wherein the process learning graph defines user input requirements.

3. The method of claim 2, wherein the process learning graph identifies format constraints for the user input requirements.

4. The method of claim 1, wherein the recording comprises a script.

5. The method of claim 1, wherein the recording comprises a video recording.

6. The method of claim 5, wherein the video recording comprises annotations identifying at least one of: user inputs, screen headings, and actions.

7. The method of claim 6, comprising extracting the process flow, the process screen transitions, and the process steps using the annotations.

8. The method of claim 1, wherein the document output comprises instructions for steps to be completed on a process screen.

9. The method of claim 1, comprising identifying system responses based upon identified user inputs and wherein the document output comprises the system responses.

10. An apparatus for generating a process learning graph and a document output from a recorded process for training a cognitive agent, the apparatus comprising:
at least one processor; and
a computer readable storage medium having computer readable program code embodied therewith and executable by the at least one processor, the computer readable program code comprising:
computer readable program code that obtains a recording of a process, wherein the recording comprises a demonstration of executing the process;
computer readable program code that generates, using the recording, the process learning graph, wherein the process learning graph identifies a process flow;
computer readable program code that generates, using the recording, the document output, wherein the document output comprises process screen transitions and process steps;
computer readable program code that expands a knowledge base of the cognitive agent by providing the process learning graph and the document output to a cognitive agent
computer readable program code that accesses, by the cognitive agent and responsive to receiving a request by a user corresponding to the process, the knowledge base for the process learning graph and the document output; and
computer readable program code that assists, using the cognitive agent, the user with at least one step of the process by traversing the process learning graph and confirming process flow steps.

11. A computer program product for generating a process learning graph and a document output from a recorded process for training a cognitive agent, the computer program product comprising:
a computer readable storage medium having computer readable program code embodied therewith, the computer readable program code comprising:
computer readable program code that obtains a recording of a process, wherein the recording comprises a demonstration of executing the process;
computer readable program code that generates, using the recording, the process learning graph, wherein the process learning graph identifies a process flow;
computer readable program code that generates, using the recording, the document output, wherein the document output comprises process screen transitions and process steps;
computer readable program code that expands a knowledge base of the cognitive agent by providing the process learning graph and the document output to a cognitive agent
computer readable program code that accesses, by the cognitive agent and responsive to receiving a request by a user corresponding to the process, the knowledge base for the process learning graph and the document output; and
computer readable program code that assists, using the cognitive agent, the user with at least one step of the process by traversing the process learning graph and confirming process flow steps.

12. The computer program product of claim 11, wherein the process learning graph defines user input requirements.

13. The computer program product of claim 12, wherein the process learning graph identifies format constraints for the user input requirements.

14. The computer program product of claim 11, wherein the recording comprises a script.

15. The computer program product of claim 11, wherein the recording comprises a video recording.

16. The computer program product of claim 15, wherein the video recording comprises annotations identifying at least one of: user inputs, screen headings, and actions.

17. The computer program product of claim 16, comprising computer readable program code that extracts the process flow, the process screen transitions, and the process steps using the annotations.

18. The computer program product of claim 11, wherein the document output comprises instructions for steps to be completed on a process screen.

19. The computer program product of claim 11, comprising computer readable program code that identifies system responses based upon identified user inputs and wherein the document output comprises the system responses.

20. A method for generating a process learning graph and a document output from a recorded process for training a cognitive agent, the method comprising:

utilizing at least one processor to execute computer code that performs the steps of:

obtaining a recording of a process, wherein the recording comprises a demonstration of executing the process;

identifying at least one system response, occurring during execution of the process, based upon at least one user input;

producing, from the recording, at least one screen capture of a process screen transition;

identifying, from the recording, process screen headings;

defining, from the recording, user input requirements during execution of the process;

generating the process learning graph, wherein the process learning graph identifies a process flow comprising a plurality of process flow steps;

the plurality of process flow steps comprising the process screen headings and user input requirements;

generating the document output, wherein the document output comprises the at least one screen capture, at least one system response, and at least one process step;

providing the process learning graph and the document output to the cognitive agent;

receiving, at the cognitive agent, a message from a user, wherein the user is executing the process;

mapping the message to at least one process flow step in the process learning graph;

confirming, with the user, the mapped at least one process flow step; and verifying, with the user, that the user performed process flow steps, contained within the process learning graph, preceding the at least one process flow step.

* * * * *